United States Patent

[15] 3,653,675

Schaefer

[45] Apr. 4, 1972

[54] LUBRICANT-SEALER RIBBON

[72] Inventor: William L. Schaefer, Palatine, Ill.

[73] Assignee: Felt Products Mfg. Co.

[22] Filed: Nov. 24, 1969

[21] Appl. No.: 879,307

[52] U.S. Cl. ........................................................277/235
[51] Int. Cl. ........................................................F16j 15/14
[58] Field of Search............308/238, DIG. 9; 277/235, 167, 277/DIG. 6

[56] References Cited

UNITED STATES PATENTS

| | | | |
|---|---|---|---|
| 3,002,770 | 10/1961 | Chesnut | 277/167 |
| 2,815,252 | 12/1957 | Baker | 308/238 X |
| 2,600,321 | 6/1952 | Pyle | 308/DIG. 9 |

*Primary Examiner*—Robert I. Smith
*Attorney*—Dressler, Goldsmith, Clement & Gordon

[57] ABSTRACT

A lubricating and sealing ribbon is provided for forming a sealed joint between male and female threaded members. The ribbon comprises a matrix of a soft thermoplastic polymer oriented in the longitudinal direction of the ribbon and filled with lubricant particles.

In use, the ribbon is wrapped around the threads of the male joint for at least one turn, the ribbon is stretched transversely to conform to the contour of the male threads and then the wrapped male member is inserted into the female member and threaded into tight connection. During the threading, the ribbon is distorted and compressed to fill the space between the male and female threads.

11 Claims, 2 Drawing Figures

3,653,675

Inventor
William L. Schaefer
By Dressler, Goldsmith,
Clement and Gordon
Attys.

LUBRICANT-SEALER RIBBON

BACKGROUND OF THE INVENTION

This invention relates to a ribbon, or tape, for sealing and lubricating threaded connections, and particularly threaded pipe connections.

It is known to use sealing compounds on threaded pipe joints to fill the space between the male and female threads and thereby provide a leak-proof joint. Sealing compounds, however, are often inconvenient to apply because of stickiness or because the characteristics of the compounds change in storage.

It has been proposed to utilize a lubricating and sealing ribbon or tape as a sealant in threaded pipe connections; and U.S. Pat. No. 3,002,770 discloses such a ribbon formed from coherent unsintered polytetrafluoroethylene film.

The use of a polytetrafluoroethylene ribbon in threaded joints provides convenience unobtainable in the use of sealing compounds, however there are concomitant disadvantages, particularly at high temperatures.

For one thing, polytetrafluoroethylene is disadvantageous for use in threaded connections exposed to temperatures in excess of about 600° F. because it decomposes to form fluorine and fluorine-containing products which are both toxic and highly corrosive.

There is another disadvantage at high temperatures in that polytetrafluoroethylene when exposed to temperatures in excess of about 600° F. decomposes completely, leaving no residue and thus leaving no seal in the threaded connection.

Finally, the cost of polytetrafluoroethylene is substantially higher than that of most thermoplastic materials; and this factor necessitates a high cost in products fabricated therefrom.

The lubricating and sealing ribbon of this invention overcomes these difficulties and provides a relatively low cost product in a convenient form for lubricating and sealing threaded connections.

DESCRIPTION OF THE INVENTION

In accordance with this invention, a lubricating and sealing ribbon is provided which comprises an elongated strip of substantially greater width than thickness, said strip comprising a soft thermoplastic polymer oriented in the direction of the length of the strip and containing lubricant particles as filler.

In use, the ribbon is circumferentially wound around the threads of a male fitting for at least one turn therearound, and preferably more than one turn, the ribbon is then stretched transversely to conform at least partially to the contour of the threads and then the male fitting is positioned within the female fitting for tightening by imparting relative rotation between them to form the desired connection while compressing and distorting the ribbon to fill the space between the male and female threads.

In a preferred embodiment there is an adhesive layer on one side of the ribbon to provide adhesion of the ribbon to the threads of the male fitting and of each layer of the ribbon to the underlying layer when more than one wraparound is used.

THE DRAWINGS

FIG. 1 is a perspective view of a severed end of the lubricating and sealing ribbon of this invention, with its thickness exaggerated for clarity; and FIG. 2 is a sectional view of a threaded joint at a stage in its preparation after the ribbon has been applied and transversely stretched and after the male and female fittings have been partially rotated into the final tight connection.

DESCRIPTION OF SPECIFIC EMBODIMENT

Figure 1:
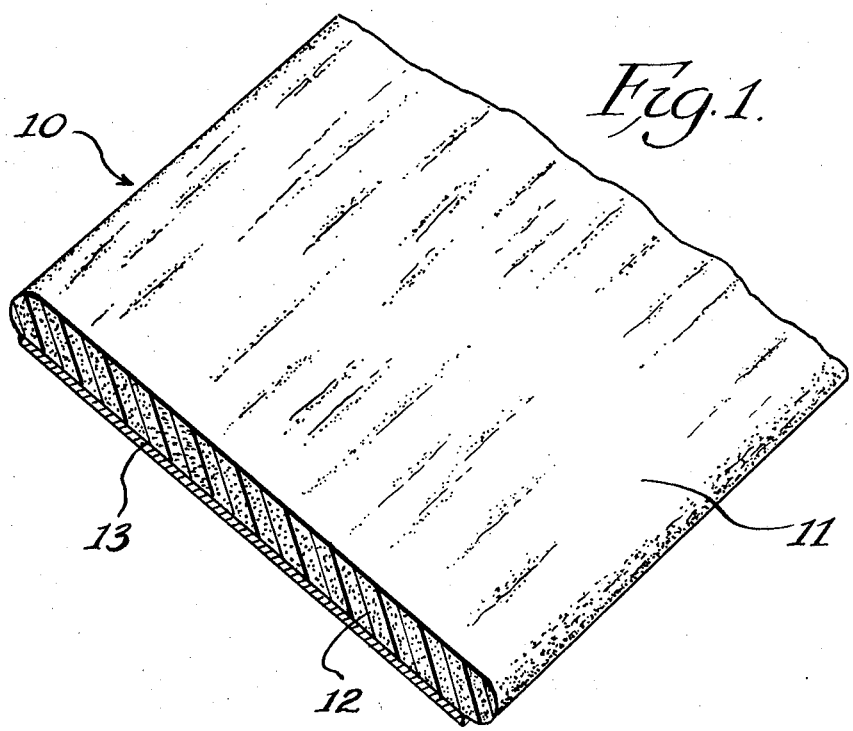

FIG. 1 shows that the ribbon 10 of this invention, in a preferred embodiment, comprises two layers, a lubricant-filled thermoplastic polymer layer 11 having a severed end 12 and an adhesive layer 13.

Figure 2:
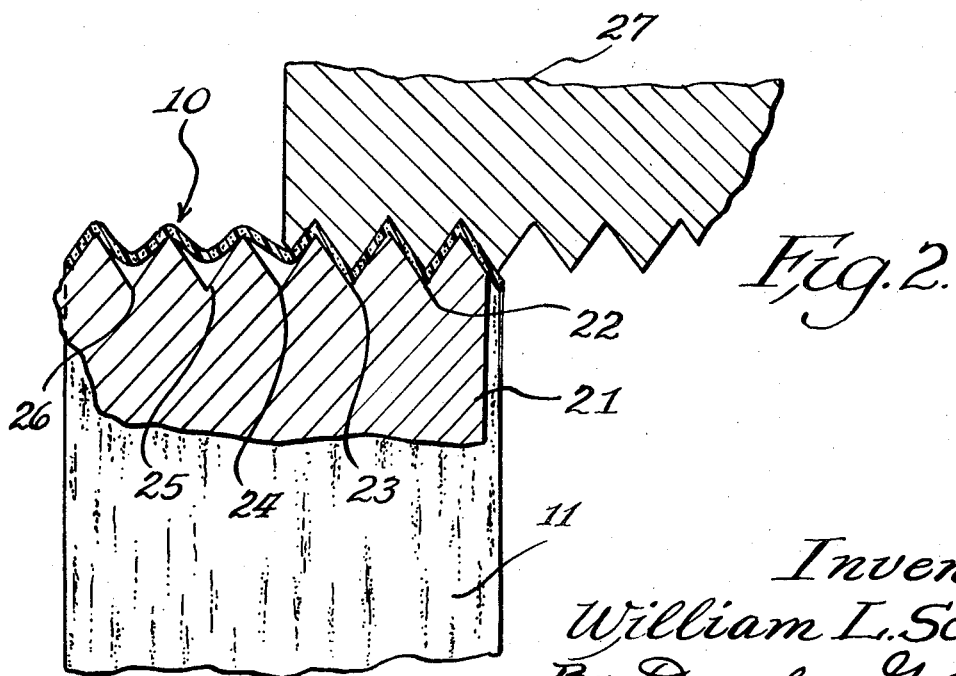

FIG. 2 shows the ribbon 10 wound around male member 21 and transversely stretched so that it partially conforms to the contour of the threads, partially entering into grooves 24, 25 and 26. FIG. 2 also shows female member 27 partially threaded onto the male member so that the portion of ribbon 10 which is in grooves 22 and 23 is distorted to completely fill the space between the male and female threads.

The thermoplastic polymer layer 11 of the ribbon is typically made of a soft polymer, such as low density polyethylene, which is oriented in a direction lengthwise of the ribbon so that its strength is much higher in the lengthwise direction than in the transverse direction and its stretchability is much higher in the transverse direction than in the lengthwise direction. Preferably, the ribbon is transversely stretchable (without rupture) to at least 1½ times its ordinary width.

Other suitable soft polymers include copolymers of ethylene and vinyl acetate, polyvinyl chloride, copolymers of vinyl chloride and vinyl acetate, and polyvinylidene chloride, plasticized, as desired, with known plasticizers to enhance softness.

The width and thickness of the ribbon are matters of convenience and depend on the nature of the fittings to be sealed. Widths are generally from about ½ to 2 inches, and preferably from about three-fourths to 1½ inches. Thicknesses are generally from about 1 to 20 mils and preferably from about 1 to 5 mils.

Uniformly distributed within the thermoplastic polymer layer are finely divided particles of a solid lubricant, such as graphite. The lubricant particles provide anti-seize properties to the ribbon, permitting the male and female fittings to be fully engaged along the threads without the application of excessive force and permitting them to be separated, if desired, even after long periods of engagement after severe service under high temperature conditions.

The proportion of lubricant particles in the thermoplastic polymer layer is not critical since even very small amounts of lubricant will provide some enhancement of lubricity and since larger amounts provide greater lubricity and are useable until an amount is reached which causes substantial deterioration of the cohesiveness of the thermoplastic polymer. The optimum proportion of lubricant is dependent on the nature of the polymer, the nature of the lubricant, and the amount of lubricity desired. A suitable range for many systems is from about 1 to about 40 weight percent of lubricant particles based on the total weight of the (filled) thermoplastic polymer layer.

The lubricant may be any finely divided solid lubricant material such as graphite, molybdenum sulfide, copper, lead oxide or antimony oxide, or any mixture of these materials. In addition, small amounts of liquid "extreme pressure" lubricants, such as alkyl or aryl phosphates, may be included. These materials, preferably in proportions from about 1 to about 30 weight percent based on the entire weight of the polymer layer, help to plasticize the film, reduce its strength and contribute to metal-to-metal lubrication.

The degree of orientation in the polymer layer may vary depending on the polymer used and its previous history, the amount and nature of the lubricant particles and the plasticizer, when used. For most systems, the orientation produced by cold stretching the polymer film to about three to four times its original length is suitable.

When an adhesive layer is desired, a pressure sensitive adhesive composition is applied as a uniform layer to one side of the oriented film layer, generally before it is slit into ribbon width. Any of the known pressure sensitive adhesive compositions may be used.

In a typical embodiment, 60 pounds of polyethylene (commercial pellet form), having a specific gravity of 0.916 and a melt index of 2.5 is compounded with lubricant fillers on a hot two-roll mill. The mill rolls are heated to 375° F. and 27 pounds of copper pigment and 13 pounds of graphite are milled into the resin. The compounded mixture is cooled to room temperature and granulated to pass through ⅛ inch openings.

A film of the above-filled polyethylene compound is produced with blown film equipment in a 5 mil thickness. The film is cold oriented by stretching it at a 4:1 ratio at room temperature, reducing its thickness to about 2½ mils and its width by about 55 percent. The film is then coated on one side with a pressure sensitive adhesive composition to provide an adhesive layer of about ½ mil thickness and is slit into tapes, or ribbons ½ inch wide.

The above tape is wound around a male fitting having ¾ × 10 tapered pipe threads, and transversely stretched to conform to the grooves of the thread. The wound male fitting is then threaded into a corresponding female fitting requiring only moderate force to make a tightly sealed joint. As the fittings are threaded together, the ribbon is deformed to completely fill the space between the male and female threads.

When the threaded connection of this invention is exposed to very high temperatures, the thermoplastic polymer will decompose in the same manner as the polytetrafluoroethylene of the prior art product. However, unlike the prior art product, the product of the instant invention will leave a residue of lubricant filler particles to provide a seal even after decomposition of the resin. Most of the filler particles contemplated are either solid oxides of high decomposition temperatures or are converted to solid oxides of high decomposition temperatures. Even graphite which is converted to gaseous decomposition products is stable to about 800°–900° F., thus providing sealing action at temperatures above the decomposition temperatures of the resins.

It is also to be noted that when the thermoplastic polymer is a halogen-free material such as polyethylene or a copolymer of ethylene and vinyl acetate, its decomposition products are non-toxic and non-corrosive.

While the invention has been described with respect to a specific embodiment thereof, it is to be understood that variations may be made by those skilled in the art without departing from the scope of the appended claims.

I claim:

1. A lubricating and sealing ribbon comprising an elongated strip of substantially greater width than thickness, said strip comprising a soft thermoplastic polymer oriented in the direction of the length of the strip and which is capable of stretching without break in the direction of its width to at least 1½ times its normal width and containing solid lubricant particles as filler, whereby when said ribbon is circumferentially wrapped around the threads of a male fitting the ribbon is stretched transversely substantially to conform to the contour of said male threads without break, and whereby when a threaded joint incorporating said ribbon is heated to temperatures in excess of 600° F., the solid lubricant continues to seal said joint.

2. The ribbon of claim 1 wherein said soft thermoplastic polymer is low density polyethylene.

3. The ribbon of claim 1 wherein said soft thermoplastic polymer is plasticized polyvinyl chloride.

4. The ribbon of claim 1 having a layer of pressure sensitive adhesive on one side thereof.

5. The ribbon of claim 1 wherein said lubricant particles comprise graphite.

6. The ribbon of claim 1 wherein said lubricant particles comprise molybdenum sulfide.

7. The ribbon of claim 1 wherein said lubricant particles comprise copper.

8. The ribbon of claim 1 wherein said lubricant particles comprise lead oxide.

9. The ribbon of claim 1 wherein said lubricant particles comprise antimony oxide.

10. The ribbon of claim 1 wherein said thickness is between about 2 and 5 mils.

11. The ribbon of claim 1 wherein some of said lubricant particles comprise graphite and other lubricant particles comprise copper.

* * * * *